United States Patent [19]
Hart

[11] 3,952,996
[45] Apr. 27, 1976

[54] VALVES

[75] Inventor: John Charles Humphreys Hart, Sheffield, England

[73] Assignee: Bridon Engineering Limited, Sheffield, England

[22] Filed: Oct. 4, 1974

[21] Appl. No.: 512,255

[30] Foreign Application Priority Data
Oct. 5, 1973 United Kingdom............... 46525/73

[52] U.S. Cl............................ 251/324; 137/625.69; 251/367
[51] Int. Cl.²..................... F16K 27/04; F15B 13/04
[58] Field of Search................ 137/625.69; 251/325, 251/367, 324

[56] References Cited
UNITED STATES PATENTS

| 1,704,759 | 3/1929 | Miller | 251/324 |
| 3,199,538 | 8/1965 | Anthon | 251/367 X |
| 3,275,024 | 9/1966 | Kracht et al. | 251/367 X |
| 3,354,912 | 11/1967 | Gordon et al. | 137/625.69 |
| 3,384,122 | 5/1968 | Harpman | 251/367 X |
| 3,532,122 | 10/1970 | Bienzeisler | 251/367 X |
| 3,542,065 | 11/1970 | Holbrook | 137/625.69 X |
| 3,680,596 | 8/1972 | Pickett | 137/625.69 |

FOREIGN PATENTS OR APPLICATIONS

| 178,098 | 2/1962 | Sweden | 251/367 |
| 374,289 | 2/1964 | Switzerland | 137/625.69 |

*Primary Examiner*—Alan Cohan
*Assistant Examiner*—Gerald A. Michalsky
*Attorney, Agent, or Firm*—Morgan, Finnegan, Pine, Foley & Lee

[57] ABSTRACT

The invention relates to mounting of spool and sleeve valves within a housing by mounting the sleeve by a number of diaphragm members. A spool and sleeve valve having a housing of a plurality of juxtaposed tubular members is also disclosed. The diaphragm members are formed of a synthetic plastics material.

8 Claims, 5 Drawing Figures

VALVES

The invention relates to valves and more particularly to spool and sleeve valves for directing fluid to control apparatus such as cylinders for machine tool operation and other industrial applications.

According to one aspect of the invention a valve comprises a valve housing containing a ported sleeve and a moveable spool member reciprocably mounted in the sleeve, the sleeve being mounted in the housing by a plurality of diaphragm members of synthetic plastics material.

The housing may comprise a plurality of juxtaposed generally annular members each integrally formed with one of said diaphragm members. Each said annular member may have a radially outer portion formed with flat coplanar opposed faces, one said face being formed with an annular protrusion and the opposed side face being formed with a corresponding annular depression and each said protrusion being engaged within the depression of the next adjacent annular member. The protrusions and depressions may each have a generally triangular cross-section and their faces may be formed with further corresponding protrusions and depressions.

The valve housing may comprise a plurality of juxtaposed tubular members with a diaphragm member sealingly engaged between each adjacent pair of tubular members. The tubular members may be moulded of synthetic plastics material, may be formed with mating surfaces so as to be a snap fit with adjacent tubular members or may be clamped or adhered to adjacent tubular members.

Each diaphragm member may be formed with an annular lip seal which engages said sleeve. Each diaphragm member may be formed with a plurality of circumferentially spaced, radially inwardly directed teeth which engage the lip seal of the next adjacent diaphragm member and tend to urge said lip seal into contact with the sleeve. Each diaphragm member may be moulded of a plastics material having properties including an elastic memory, each member having been stretched to allow insertion of the sleeve and having been heated to cause the elastic memory of the plastic to shrink back and grip the sleeve. The outer surface of the sleeve may be roughened and the lip seals conform to the roughened surface to form a labyrinth seal.

According to a further aspect of the invention a valve comprises a valve housing containing a ported sleeve and a moveable valve member reciprocably mounted in the sleeve, the valve housing comprising a plurality of juxtaposed tubular members, preferably moulded of synthetic plastics material.

Said annular or tubular members may incorporate a distributor for the valve.

A plurality of said valves may be directly coupled and/or coupled by coupling assemblies.

The foregoing and further features of the invention may be more readily understood from the following description of some preferred embodiments thereof, by way of example, with reference to the accompanying drawings, in which.

Figure 1:
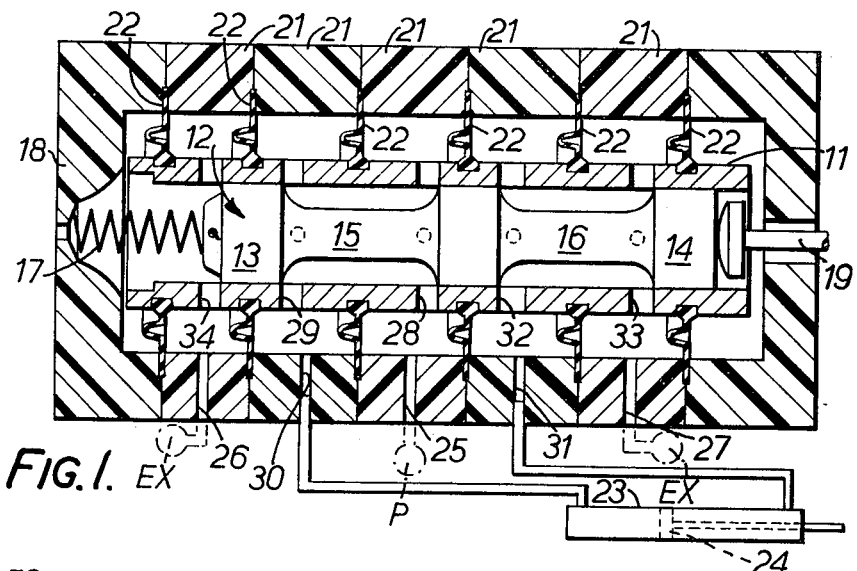
FIG. 1 is a side sectional view of a spool and sleeve valve.

Referring now firstly to FIG. 1 of the drawings the valve shown comprises a ported sleeve 11 within which is reciprocably mounted a valve spool member 12 composed of lands 13 and 14 connected by restricted portions 15 and 16. A spring 17 recessed in a cap 18 urges the spool member 12 to the right, as shown in FIG. 1 and a solenoid (not shown) acting through an armature shaft 19 actuates the spool member 12 to the left.

The sleeve 11 and spool 12 are preferably formed of a corrosion-resistant, hardened steel, having the same coefficient of expansion, and these parts are hardened and ground, honed and lapped to a fine micro-finish. The fit between the parts ranges from 165 to 210 millionths of an inch as determined on an air guage. The spring 17 is designed to be relatively long to give it a long life assuring that in any position it will not be overstressed.

The spool 11 is housed within an outer housing 20 composed of a plurality of juxtaposed tubular members 21. The spool 11 is mounted by a plurality of diaphragm members 22 which sealingly engage in grooves around the spool 11 which are sealingly retained between the members 21. The members 21 are preferably formed of a synthetic plastics material by injection moulding. They may be adhered together, formed with mating end surfaces so as to be a snap fit with adjacent members or clamped together.

The diaphragm members 22 are fabricated of synthetic plastics material capable of withstanding between 150 and 300 p.s.i. differential pressure and 150°C operating pressure. The clearance between the sleeve and the housing achieved by this form of mounting obviates the need to compensate for any warping or change in the housing relative to the spool 11. Hence it is unnecessary to conform the co-efficient of expansion of the housing to that of the sleeve and spool, so allowing the housing to be made of lighter and cheaper plastics material whilst maintaining a high grade, accurate sleeve and spool assembly.

The particular form of valve illustrated in FIG. 1. may be connected to a double-ended cylinder to meter both sides thereof. Cylinder 23 is shown with piston 24 diagrammatically in FIG. 1.

In normal use a port 25 in housing 21 is supplied with air under pressure and ports 26 and 27 pass to exhaust. With the spool 11 in the position shown in the drawing pressure is applied from port 25, through ports 28 and 29 in sleeve 12 as allowed by portion 15 of spool 11, through port 30 in housing 21 to the left side of piston 24 in cylinder 23. The right side of piston 24 is exhausted via a port 31 in housing 21, ports 32 and 33 in sleeve 11 as allowed by portion 16 in spool 12 to port 27.

When spool 12 is actuated to the left pressure is applied to the right of piston 24 via ports 25, 28, 32 and 31 and the left of piston 24 is connected to exhaust via ports 30, 29, 34 and 26.

Clearly other operational forms of the spool and sleeve as shown in FIG. 1 can be provided and the spool may be fluid actuated and/or biased as required. Further the diaphragm members 22 could be replaced by normal O-ring mountings with the members 21 being moulded to provide passages provided by the members 22 in the arrangement illustrated in FIG. 1.

Figure 2:
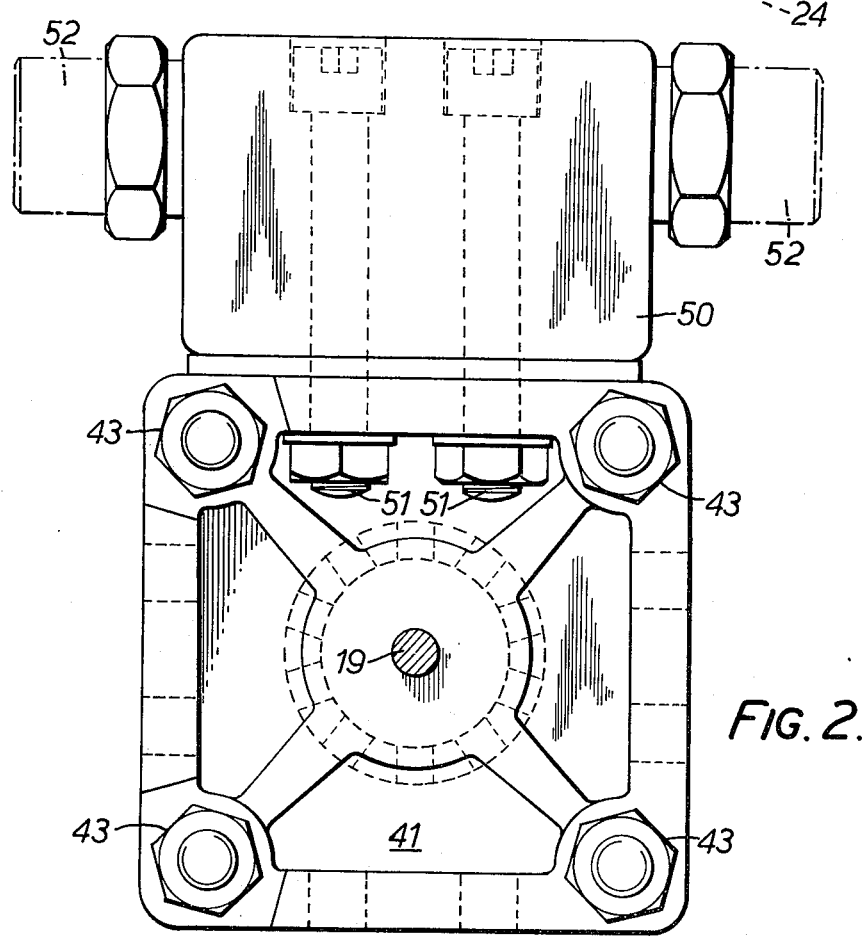
FIG. 2 is an end view of an alternative spool and sleeve valve with a distributor attached thereto.
Figure 3:
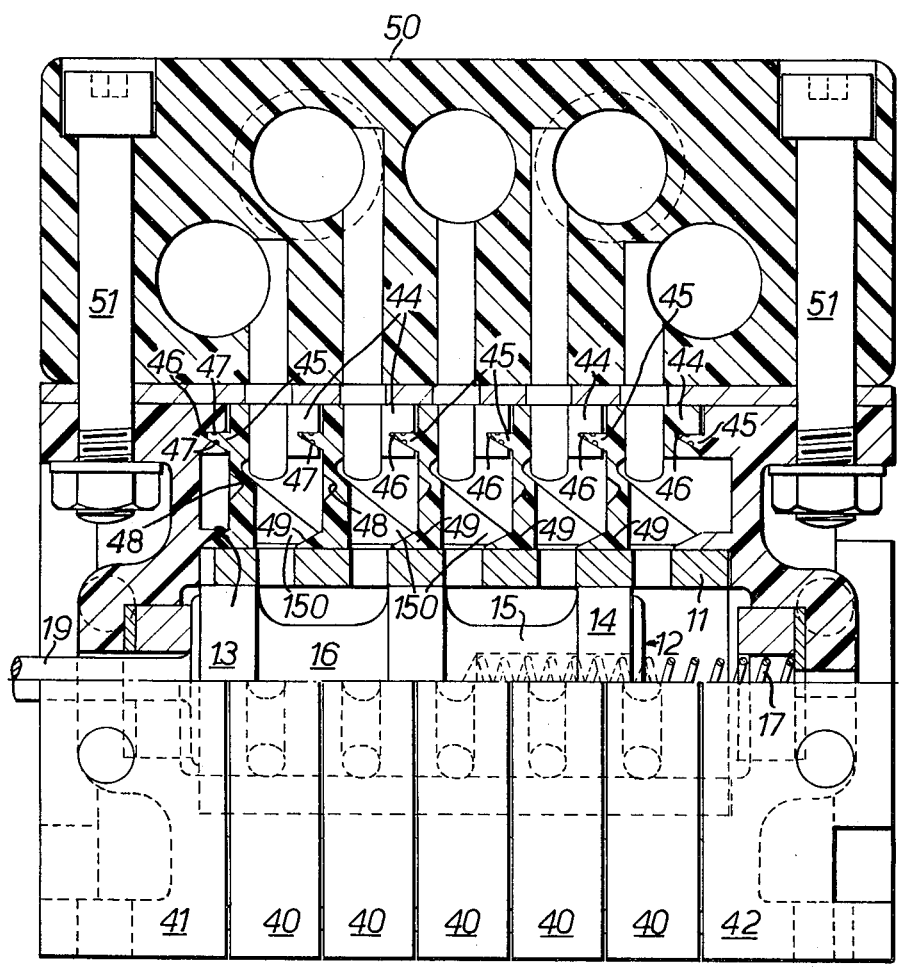
FIG. 3 is a side view, part in section of the assembly of FIG. 2.

Referring now to FIGS. 2 and 3 there is shown a modified housing and mounting arrangement for the sleeve 11. In this valve housing a plurality of generally annular (square with rounded corners) members 40 are juxtaposed and clamped between end members 41 and 42 by bolts 43 (FIG. 2). The members 40 abut one another at their radially outer peripheral portions 44 but are shown spaced apart in FIG. 3 for clarity. The portions 44 are each formed with flat opposed faces one of which is formed with an annular protrusion 45 and the other of which is formed with an annular depression 46. The engaging faces of protrusions 45 and depressions 46 are formed with further mating protrusions/depressions 47 to assist in location and enhance the seal thereat. Such protrusions/depressions 47 are optional and are provided or omitted depending upon the size of the valve.

Each portion 44 supports a diaphragm portion 48 which carries an annular lip seal 49 sealingly engaged with sleeve 11. Each diaphragm portion 48 also carries a plurality of circumferentially spaced teeth 150 which engage the rear surface of the lip seal 49 on the next adjacent member 40 to tend to urge the lip seal 49 in sealing engagement with sleeve 11.

The sleeve 11 may have a roughened outer surface e.g. formed by grinding, so that the lip seals 49 conform to this surface and form, in effect, labyrinth seals. The plastics material of the members 40 may have properties including a elastic memory. In fabrication the seals 49 are stretched to pass over sleeve 11 and are subsequently heated to cause the elastic memory of the plastics to cause shrinking back of seals 49 to grip sleeve 11. In a further alternative the lip seals 49 may engage on shoulders formed around sleeve 11. These features can equally be utilised with the FIG. 1 arrangement.

The sleeve 11 is supported wholly by diaphragm portions 48 along its length. The end members 41 and 42 are also moulded of a synthetic plastics material.

The operation of the valve shown in FIGS. 2 and 3 would be the same as described for the FIG. 1 embodiment.

The valve of FIGS. 2 and 3 is shown with a plastics moulded distributor member 50 attached thereto by bolts 51 so that external fluid connections can be made via inlets/outlets 52.

Figure 4:
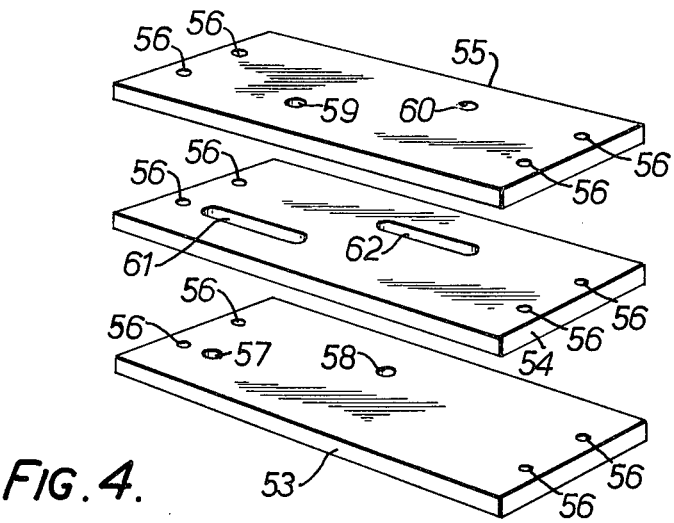
FIG. 4 is an exploded view of a coupling assembly for use with the arrangements of FIGS. 2 and 3.

Alternatively a coupling assembly as shown in FIG. 4 could be located between two valves in place of distributor member 50 so obviating the need for conduit interconnections.

The coupling assembly of FIG. 4 comprises three plate members 53, 54, 55 with aligned apertures 56 for clamping to a valve by bolts 51 as in the FIGS. 2 and 3 embodiment. Apertures 57 and 58 in member 53 are interconnected with respective apertures 59 and 60 in members 55 by respective slots 61 and 62 in member 54. Each of members 53 and 55 are clamped adjacent a separate valve and hence required interconnections are provided.

Figure 5:
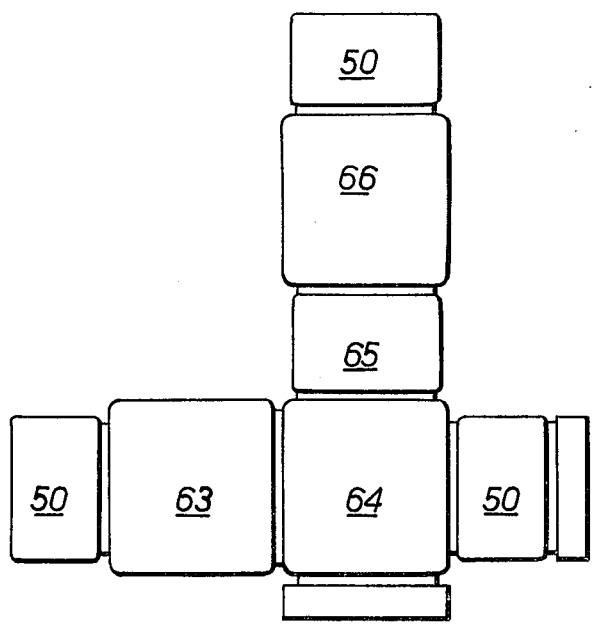
FIG. 5 is a side view of an assembly of three interconnected valves.

FIG. 5 shows an assembly of a plurality of valves in which valves 63 and 64 are directly interconnected and each have a distributor 50. Valve 64 is also connected via a coupling assembly 65 to a further valve 66 which has a distributor 50.

The interconnection arrangements of FIGS. 4 and 5 can be utilised equally with both embodiments of valves illustrated.

The synthetic plastics material for all the mouldings may be polytetrafluoroethylene.

I claim:
1. A valve comprising:
  a. a valve housing including a plurality of juxtaposed generally annular members of synthetic plastic material, each of said members having an integral diaphragm member;
  b. a ported sleeve; and
  c. a spool member, the spool member being reciprocably mounted within the ported sleeve, said diaphragm members being located to mount the sleeve within the valve housing.
2. A valve as claimed in claim 1 wherein each said annular member has a radially outer portion formed with flat coplanar opposed faces, one said face being formed with an annular protrusion and the opposed said face being formed with a corresponding annular depression and each said protrusion being engaged within the depression of the next adjacent annular member.
3. A valve as claimed in claim 2 wherein said protrusions and depressions each have a generally triangular cross-section.
4. A valve as claimed in claim 2 wherein the faces of said protrusions and depressions are formed with further corresponding protrusions and depressions.
5. A valve as claimed in claim 1 wherein said annular members are held clamped together.
6. A valve comprising:
  a. a valve housing;
  b. a ported sleeve;
  c. a spool member, the spool member being reciprocably mounted within the ported sleeve, and
  d. a plurality of diaphragm members, the diaphragm members being formed of synthetic plastics material and being located to mount the sleeve within the valve housing, each diaphragm member having an annular lip seal which engages said sleeve and a plurality of circumferentially spaced, radially inwardly direct teeth which engage the lip seal of the next adjacent diaphragm member and tend to urge said lip seal into contact with the sleeve.
7. A valve as claimed in claim 6 wherein each diaphragm member is moulded of a plastics material having properties including an elastic memory, such that, during valve fabrication, each diaphragm member may be stretched to allow insertion of the sleeve and thereafter be heated to cause the diaphragm members to shrink back and grip the sleeve.
8. A valve as claimed in claim 6, wherein the outer surface of the sleeve is roughened and the lip seals conform to the roughened surface to form a labyrinth seal.

* * * * *